(12) United States Patent
Koenig et al.

(10) Patent No.: US 10,370,479 B2
(45) Date of Patent: Aug. 6, 2019

(54) PROCESS FOR MAKING A POLYMER POLYOL

(71) Applicant: BASF SE, Ludwigshafen (DE)

(72) Inventors: Christian Koenig, Mannheim (DE); Dejan Petrovic, Osnabrueck (DE); Achim Loeffler, Puming (CN); Andreas Bauder, Mannheim (DE); Daniel Freidank, Bad Essen (DE); Dirk Opfermann, Mannheim (DE); Isa Alexandra Queiroz Da Fonseca, Ludwigshafen (DE); Caroline Mages-Sauter, Weinheim (DE); Chuan Long Fu, Shanghai (CN); Shu Kui Wang, Shanghai (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/306,338

(22) PCT Filed: Apr. 20, 2015

(86) PCT No.: PCT/EP2015/058467
§ 371 (c)(1),
(2) Date: Oct. 24, 2016

(87) PCT Pub. No.: WO2015/165761
PCT Pub. Date: Nov. 5, 2015

(65) Prior Publication Data
US 2017/0044297 A1 Feb. 16, 2017

(30) Foreign Application Priority Data
Apr. 30, 2014 (EP) ..................... 14166515

(51) Int. Cl.
*C08G 18/08* (2006.01)
*C08G 18/63* (2006.01)
*C08L 71/02* (2006.01)
*C08L 75/04* (2006.01)
*C08F 257/00* (2006.01)
*C08G 18/72* (2006.01)
*C08J 3/00* (2006.01)
*C08J 3/09* (2006.01)
*C08J 9/00* (2006.01)

(52) U.S. Cl.
CPC ........ *C08G 18/0876* (2013.01); *C08F 257/00* (2013.01); *C08G 18/633* (2013.01); *C08G 18/636* (2013.01); *C08G 18/72* (2013.01); *C08J 3/005* (2013.01); *C08J 3/09* (2013.01); *C08J 9/00* (2013.01); *C08L 71/02* (2013.01); *C08L 75/04* (2013.01); *C08J 2205/06* (2013.01); *C08J 2371/02* (2013.01); *C08J 2425/12* (2013.01)

(58) Field of Classification Search
CPC . C08F 257/00; C08G 18/0876; C08G 18/633; C08G 18/636; C08G 18/72; C08J 3/005; C08J 3/09; C08J 9/00; C08J 2205/06; C08J 2371/02; C08J 2425/12; C08L 25/12; C08L 71/02; C08L 75/04
See application file for complete search history.

(56) References Cited

U.S. PATENT DOCUMENTS

| | | | |
|---|---|---|---|
| 5,196,476 A | 3/1993 | Simroth | |
| 5,494,957 A | 2/1996 | Moore et al. | |
| 5,854,386 A * | 12/1998 | Shen | C08F 2/40 528/403 |
| 5,990,185 A | 11/1999 | Fogg | |
| 6,013,731 A * | 1/2000 | Holeschovsky | C08F 283/06 521/137 |
| 6,613,827 B2 | 9/2003 | Lundgard et al. | |
| 6,623,827 B2 | 9/2003 | Schottland et al. | |
| 7,759,423 B2 * | 7/2010 | Chauk | C08F 283/06 252/182.24 |
| 2002/0042463 A1 | 4/2002 | Lundgard et al. | |
| 2011/0213044 A1 | 9/2011 | Van der wal et al. | |

FOREIGN PATENT DOCUMENTS

| | | |
|---|---|---|
| EP | 0 162 589 A1 | 11/1985 |
| EP | 0 736 480 A1 | 7/1997 |
| EP | 1 675 885 A2 | 7/2006 |
| EP | 2 297 219 B1 | 3/2011 |
| RU | 2 265 031 C1 | 11/2005 |
| RU | 2 423 388 C2 | 7/2011 |
| WO | WO 2005/003200 A1 | 1/2005 |
| WO | WO 2009/155427 A2 | 12/2009 |
| WO | WO 2012/154393 A2 | 11/2012 |

OTHER PUBLICATIONS

International Search Report dated Jul. 13, 2015 in PCT/EP2015/058467 filed on Apr. 20, 2015.

* cited by examiner

*Primary Examiner* — John M Cooney
(74) *Attorney, Agent, or Firm* — Oblon, McClelland, Maier & Neustadt, L.L.P.

(57) ABSTRACT

This invention relates to a continuous process for making a polymer polyol, the polymer polyol produced according to the said process and its applications.

27 Claims, 1 Drawing Sheet

Figure 1/2
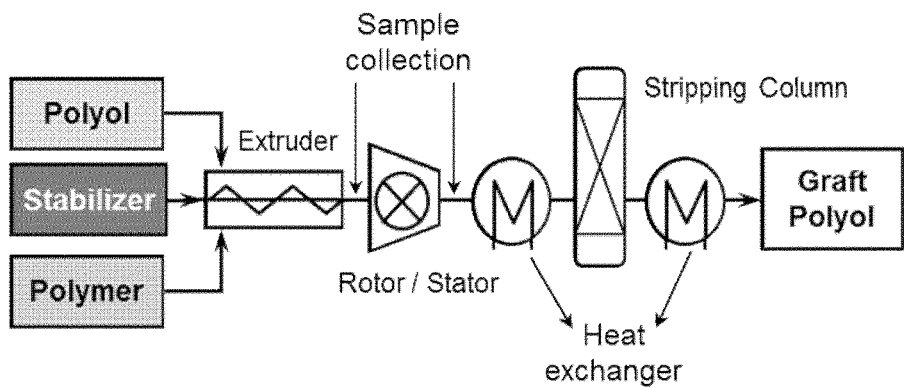
Figure 2/2
Schematic representation of extruder set-up and dosing positions for each of the components as used for examples given above. Number 1 to 10 represent the extruder barrels (process zones) and 11 the extruder head
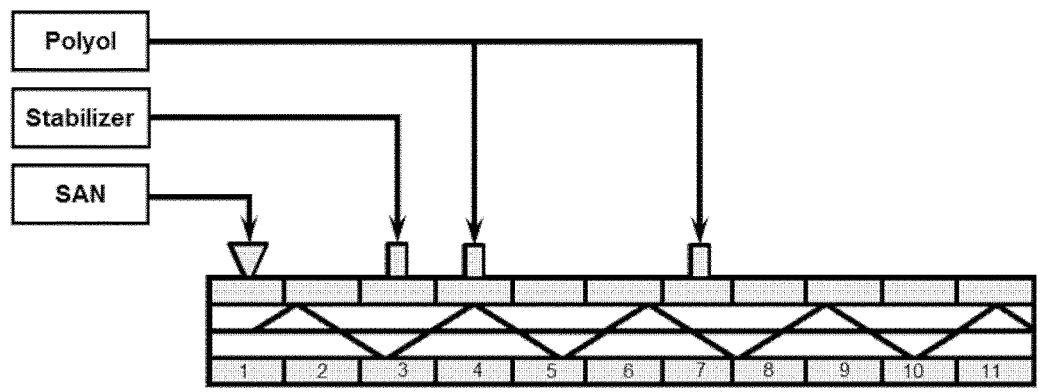

PROCESS FOR MAKING A POLYMER POLYOL

This invention relates to a continuous process for making a polymer polyol, the polymer polyol produced according to the said process and its applications.

WO 2009/155427 (Dow) describes a melt dispersion process for making polymer polyols by dispersion polystyrene via a mechanical dispersion process into a polyol by using a stabilizer consisting of 30 to 90% of styrene or a mixture of styrene and one or more other low molecular weight monomers.

Polymer polyols, also known as filled polyols, are viscous fluids comprising fine particles dispersed in polyols. Examples of solids used include styrene-acrylonitrile co-polymers and polyureas. The solids are typically prepared by in situ polymerization of monomers in the base polyol. Polymer polyols are commonly used for the production of polyurethane foams.

Melt emulsification is, however, an entirely different process. Since there is no chemical polymerization reaction, the dispersion is created through a physical (i. e. mechanical) process. Therefore, the melt emulsification method also requires different stabilizers.

The Term Melt Emulsification is Defined in WO2009/155427 as Follows:

Another way of dispersion the previously-formed polymer is to melt it, and then blend the molten polymer with the polyol under shear. The shearing action breaks the molten polymer into small droplets which become dispersed in the polyol phase. This process is described in U.S. Pat. No. 6,623,827. That patent describes a process wherein a previously-formed polymer is melted in an extruder, mixed with a surfactant and a polyether polyol, and subsequently mixed with more of with the polyether polyol. The mixture is then cooled to solidify the particles.

Polymer polyol production processes usually encounter the problem of how to achieve small average particle sizes and uniform particles. Additionally, it is not always easy to obtain low viscosities in the produced polymer polyol dispersions, and furthermore, in some cases the produced polymer polyol dispersions segregate and are not stable.

The inventive process aims to overcome the mentioned problems. Thus, it aims for small average particle sizes and uniform particles, and, preferably, a low viscosity.

Moreover, the polymer polyol dispersion should be stable for a prolonged time (the stability may be determined by storing samples for a prolonged time and visually inspecting them before and after the storage period of, usually, six months. When no precipitation has been formed at the bottom of the sample container (i. e. no phase separation), the sample is considered to be stable.).

The process for making a polymer polyol should preferably also be easy to perform.

Surprisingly, the mentioned problems could be overcome by the inventive process, as defined in claim 1 and the following claims.

Thus, one object of the present invention is a continuous process for making a polymer polyol, comprising mixing at least one melted thermoplastic styrene-acrylonitrile-copolymer (TP) with at least one polyol (P) in the presence of at least one stabilizer (S), comprising from 10 to 70% by weight, preferably 30 to 60% by weight, more preferably 40 to 55% by weight, based on the sum of all components, at least one polyol P2, and at least one polyol CSP which comprises the reaction product of at least one macromere M, styrene and acrylonitrile in P2, optionally with an initiator and/or a chain transfer agent, wherein the content of macromere M of the stabilizer (S) is between 30-70 wt %, preferably 35 to 54 wt %, based on the sum of all components, and/or wherein the polyol CSP is preferably comb-structured, and wherein, in a first step (1), TP, P and S are fed into an extruder (E) to form an initial dispersion, and the initial dispersion obtained from the extruder is then fed, in a second step (2), into at least one rotor-stator device (RS) comprising at least one rotor-stator combination, and (3) the dispersion is cooled below the $T_g$ of the thermoplastic styrene-acrylonitrile-copolymer (TP) after passing all of the rotor-stators (RS) to obtain the final polymer polyol.

Further objects of this invention include a polymer polyol, obtainable by the inventive process, and a process for the production of a polyurethane, comprising reacting at least one polymer polyol obtainable by the inventive process and optionally at least one further polyether polyol with at least one di- or polyisocyanate and optionally a blowing agent.

In the present specification, a macromere is defined as a molecule which comprises one or more polymerizable double bonds and one or more hydroxyl-terminated polyether tails. Various macromeres are known and have previously been used to stabilize polymer polyols by co-polymerization with one or more ethylenically unsaturated monomers (such as, for example, styrene and acrylonitrile). Because of similarities in chemical composition, the polyether tail(s) energetically favor association with the polyol molecules in the continuous phase rather than with the styrene-acrylonitrile co-polymer. The polyether tails extend into the continuous phase, thereby forming a "brush" layer near the particle-fluid interface which screens the attractive van der Waals forces between particles. This phenomenon is known as steric stabilization. In order to form a brush layer which effectively screens van der Waals forces several conditions must be met. The polyether tails must be similar in chemical composition to the continuous phase so that they fully extend into the continuous phase and do not adsorb to the particles. Also, the surface coverage and molecular weight must be high enough so that the interfacial brush layer is sufficiently thick to prevent agglomeration of the solid particles.

A number of methods for inducing reactive unsaturation into a polyol, thereby forming a macromere, are known in the art. U.S. Pat. No. 6,013,731 teaches several techniques, including reaction of a polyol with unsaturated isocyanates (such as isocyanatoethylmethacrylate (IEM) or α,α-dimethyl metaisopropenyl benzylisocyanate (i.e. TMI)), or reaction of a polyol with maleic acid or maleic anhydride, followed by isomerization of the maleate bond to the more reactive fumarate bond. A macromere prepared by transesterification of a vinylalkoxy silane with a polyol has been disclosed in EP 0,162,589.

EP 1 675 885 Gives a Definition of the Term Preformed Stabilizer:

A pre-formed stabilizer (PFS) is particularly useful for preparing a polymer polyol having a lower viscosity at a high solids content. In the pre-formed stabilizer processes, a macromere is reacted with monomers to form a co-polymer of composed of macromere and monomers. These co-polymers comprising a macromere and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obtained. Preferably, the reaction conditions are controlled such that the particle size is small, thereby enabling the particles to function as "seeds" in the polymer polyol reaction.

For example, U.S. Pat. No. 5,196,476 discloses a preformed stabilizer composition prepared by polymerizing a macromere and one or more ethylenically unsaturated monomers in the presence of a free-radical polymerization initiator and a liquid diluent in which the pre-formed stabilizer is essentially insoluble. EP 0,786,480 discloses a process for the preparation of a preformed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromere, at least one ethylenically unsaturated monomer, and a free radical polymerization initiator.

It is known that large, bulky molecules are effective macromeres because less material can be used to sterically stabilize the particles. See, for example, EP 0786480. Generally speaking, this is due to the fact that a highly branched polymer has a considerably larger excluded volume than a linear molecule (such as, e.g., a monol), and therefore less of the branched polymer is required. U.S. Pat. No. 5,196,476 discloses that functionalities of 2 and higher, and preferably 3 and higher, are suitable to prepare macromeres.

Macromeres based on multi-functional polyols and which have multiple sites of reactive unsaturation are described in U.S. Pat. No. 5,196,476. As described therein, there is an upper limit to the concentration of unsaturation when making macromeres by the maleic anhydride route. If the ratio of moles of unsaturation per mole of polyol is too high, then there is a higher probability that species will be formed which have more than one double bond per molecule. Typically, the '476 patent employs from about 0.5 to about 1.5 moles, and preferably from about 0.7 to about 1.1 moles, of the reactive unsaturated compound for each mole of the alkoxylated polyol adduct.

As explained above, preformed stabilizers (PFS) are in principle known in the art for processes to form a dispersion by radical polymerization. However, the requirements for stabilizers to be used in the inventive melt emulsification process are different (even though the manufacturing of the stabilizers may be similar).

The inventive melt emulsification process involves only physical mixing of the components, rather than a chemical reaction. In the conventional methods (radical polymerization), the PFS are added during the radical polymerization. Thus, the dwell times are different, and there is no further radical polymerization taking place in the melt emulsification process.

The stabilizers (S) used in the inventive melt emulsification process usually have a viscosity between 1000 and 100000 mPas, preferably 5000 to 80000 mPas at 25° C., determined according to DIN EN ISO 3219 at a shear rate of 100 1/s.

Furthermore, stabilizers (S) used in the inventive melt emulsification process usually have an OH number of 1 to 100, preferably 1 to 50, even more preferably 10 to 40 mg KOH/g. The hydroxyl number was, unless indicated otherwise, determined in accordance with DIN 53240 from 2012 (DIN="Deutsche Industrienorm", i. e. German industry standard).

The viscosity of the stabilisers and polyols was, unless indicated otherwise, determined at 25° C. in accordance with DIN EN ISO 3219 from 1994 by means of a Rheotec RC20 rotational viscometer using the spindle CC 25 DIN (spindle diameter: 12.5 mm; internal diameter of measuring cylinder: 13.56 mm) at a shear rate of 100 1/s (instead of 50/1s).

The particle size distribution of the dispersion was determined by static laser diffraction using a Mastersizer 2000 (Malvern Instruments Ltd) after dilution of the sample with isopropanol in order to obtain an optical concentration suitable for the measurement. For the dispersion of the sample a dispersing module Hydro SM was used with a stirrer speed of 2500 rpm. The calculation of the particle size distribution was performed by the Mastersizer 2000 using Fraunhofer theory.

The diameter D10 ($x_{10,3}$) defines the particle size at which 10 percent of the disperse phase volume of the particles are smaller. The diameter D50 ($x_{50,3}$) defines the particle size at which 50 percent of the disperse phase volume of the particles are smaller. The diameter D90 ($x_{90,3}$) defines the particle size at which 90 percent of the disperse phase volume of the particles are smaller. A more detailed description is available in DIN ISO 9276-2, 2009.

In one embodiment, the inventive stabilizer (S) comprises from 10 to 70% by weight, preferably 30 to 60% by weight, more preferably 40 to 55% by weight, based on the sum of all components, at least one polyol P2, and at least one polyol CSP which comprises the reaction product of at least one macromere M, styrene and acrylonitrile in P2, optionally with an initiator and/or a chain transfer agent, wherein the content of macromere M of the stabilizer (S) is between 35 to 54 wt %, based on the sum of all components, and/or wherein the polyol CSP is preferably comb-structured.

In another embodiment, the stabilizer (S) consists of one or two polyols P2 and one or two polyols CSP which comprise the reaction product of at least one macromere M, styrene and acrylonitrile in P2, optionally with an initiator selected from the group consisting of azo initiators and peroxide initiators, and/or a chain transfer agent selected from the group consisting of dodecane thiol, isopropanol and 2-butanol.

In another embodiment, the stabilizer (S) consists of one or two polyols P2 one or two polyols CSP which consist of the reaction product of a macromere M, styrene and acrylonitrile in P2.

In another embodiment, the macromere M has an average molecular weight of from 1000 to 50000 g/mol, preferably 2000 to 30000 g/mol, more preferably 3000 to 20,000 g/mol.

In another embodiment, the macromere M has from 0.2 to 1.2 polymerizable ethylenically unsaturated groups per molecule in average and/or from 2 to 8 hydroxyl groups per molecule.

In another embodiment, the macromere M is obtained by reacting TMI with a polyether polyol PM, optionally in the presence of a Lewis acid catalyst.

In another embodiment, the polyether polyol PM used in the production of the macromere M is selected from the group consisting of three- and sixfunctional polyether polyols, preferably from the group consisting of glycerine, sorbitol and 1,1,1-trimethylol propane (TMP).

In another embodiment, the ratio of styrene to acrylonitrile is greater than 1:1, preferentially greater 1:1.5, most preferred greater 1:2.

In another embodiment, the viscosity of the stabilizer is between 1000 and 100000 mPas, preferably 5000 to 80000 mPas at 25° C., determined according to DIN EN ISO 3219 and a shear rate of 100 1/s.

In another embodiment, the overall content of styrene of the stabilizer (S) is between 0.5-20 wt %, preferably 4 to 15 wt %, and/or the overall content of acrylonitrile of the stabilizer (S) is between 0.5-15 wt %, preferably 2 to 7 wt %, and/or the overall content of polyol P2 of the stabilizer (S) is between 20-70 wt %, preferably 32 to 55 wt %.

In another embodiment, no additional solvent is used in the stabilizer.

General Procedure for Synthesizing a Stabilizer:

A macromere is defined as a molecule which comprises one or more polymerizable double bonds and one or more polymerizable double bonds and one or more hydroxyl-terminated polyether chains. A number of methods for inducing reactive unsaturation into a polyol are known in the art. The synthesis of useful macromere is described in WO2005/003200 (page 10, line 26). Macromere A is a product obtained by reaction of a three-functional polyether polyol with 1,1-Dimethyl meta-isopropenylbenzylisocyanat (TMI). The viscosity was 1440 mPas at 25° C. and the OH value was 23 mg KOH/g.

A reactor was charged with a carrier polyol, a portion of the macromere A, a chain transfer agent and heated to 125° C. A mixture of carrier polyol, initiator, styrene, acrylonitrile and macromere A were added over 100 minutes. The reaction mixture was stirred for another 20 minutes at 125° C. The mixture was subsequently evacuated under reduced pressure for 120 minutes at 125° C. to remove residual monomers. The obtained stabilizer is characterized and used without further purification.

TABLE 1

| Experiment Nr. | styrene in weight % | Acrylonitrile in weight %. | Macromere A in weight % | carrier Polyol | OH— value in mg KOH/g | Viscosity in mPas |
| --- | --- | --- | --- | --- | --- | --- |
| 1 | 7.8 | 4.2 | 50 (1531) | 37 | 25.3 | 14990 |

The following dispersions were obtained by using commercially available styrene-acrylonitrile copolymer types with different compositions of styrene and acrylonitrile. For example Starex® types from Samsung, Luran® types from Styrolution, Lustran® types from Ineos can be used.

Extruder Setup, Dosing of Polyol, Stabilizer, SAN (Flow Rates, Temperature):

The twin screw extruder used has an L/D (ratio of length and diameter) of 42, and is divided into a number of process zones, each zone corresponding to one barrel. The extruder is composed of 10 barrels plus extruder head. Styrene acrylonitrile copolymer with a styrene to acrylonitrile rate of 65/35) is cold fed into barrel 1 under nitrogen atmosphere in granulate form and via a gravimetric dosing unit. Shear and heat transfer through the barrels contribute to the melting of the polymer. Lupranol® 2095 and stabilizer are dosed individually in the liquid form using gear pumps. Both are pre-heated and injected into the extruder at approximately 180° C. The stabilizer is injected into extruder barrel 3 and the polyol can be dosed in barrels 4 and 7. Both or either feed points for the polyol are possible and defined for each experiment in the table below.

The screw configuration is optimized for melting the polymer upstream, later mixing it with the stabilizer and finally emulsifying the mixture in polyol, by use of appropriate kneading, mixing, forward and reverse elements.

The extruder outlet is connected to a rotor-stator device via a heated pipe with a three-way valve for sample collection. A buffer tank can be installed between the extruder and the rotor-stator device to decouple these two devices and ensure a constant filling degree of the extruder.

A "Process-Pilot" (IKA®-Werke, GmbH & Co. KG, Staufen, Germany) rotor-stator device was used to carry out the experiments. The machine was equipped with three successive rotor-stator combinations ("generators"). The rotors were mounted on the same shaft and driven with the same rotational speed. Generator 1 at the inlet was equipped with coarse teeth, generator 2 with medium and generator 3 with fine teeth. The circumferential speed (tip speed) of the rotors is adjustable in a wide range up to approx. 41 m/s. The product was fed from a buffer tank by means of a gear pump. The product temperature at the inlet of the rotor-stator device was in the range of 160 to 250°, preferentially 180° C. to 220° C. Another three-way valve is installed after the rotor stator device for sample collection. Optionally a stripping column can be installed to remove any residual material. The product was cooled to 60° C.

EXAMPLE 1

A recipe comprised of the 40 wt % of SAN, 15 wt % stabilizer 1 and 45 wt % Lupranol® 2095 was used. All the SAN was fed into the extruder in zone 1, all the stabilizer was injected into extruder zone 3 and all the Lupranol® was injected into extruder zone 4. The respective extruder processing parameters such as barrel temperature profile, screw rotation speed and throughput can be found in Table 2. The extruder set-up used is schematically represented in FIG. 2. The sample collected after the extruder had a particle size of D50=8,955 µm, D90=88,658 µm. The sample collected after the rotor-stator device had a particle size of D50=2,089 µm, D90=8,469.

The viscosity of the sample collected after rotor stator device was 6837 mPas determined at 25° C. in accordance with DIN EN ISO 3219 from 1994.

This example shows the important influence of the rotor-stator device in order to obtain small and uniform particles. By using a rotor-stator device the particle size D90 could be reduced by a factor higher than 10. Dosing of the polyol after the PFS was observed to be beneficial for efficient stabilization.

EXAMPLE 2 (INFLUENCE OF ROTOR STATOR AND DOSING POSITION)

A recipe comprised of the 40 wt % of SAN, 15 wt % stabilizer 1 and 45 wt % Lupranol® 2095 was used. SAN was fed into the extruder in zone 1, all the stabilizer was injected into extruder zone 3 and Lupranol® 2095 was injected into extruder zone 7. The respective extruder processing parameters such as barrel temperature profile, screw rotation speed and throughput can be found in Table 2. The extruder set-up used is schematically represented in FIG. 2.

The sample collected after the extruder had a particle size of D50=5,455 µm, D90=14,852 µm. The sample collected after the rotor-stator device had a particle size of D50=1,410 µm, D90=2,116.

The viscosity of the sample collected after rotor stator device was 10266 mPas determined at 25° C. in accordance with DIN EN ISO 3219 from 1994.

Recipe & Parameters
Cavitron speed: 265 Hz
Cooling temp: 60° C.

This example shows once again the important influence of the rotor-stator device in order to obtain small and uniform particles. Alteration of the dosing position of the carrier polyol leads to a significant decrease in particle size. Dosing of the polyol at a later stage (zone 7 instead of zone 4) of the extruder may be important for obtaining smaller particles This difference is observed after the extruder in comparison to example 1 and consequently after the rotor-stator device. By dosing the Lupranol® 2095 at a later stage in the extruder the particle size D90 after extruder could be reduced by a factor of 6 compared to example 1 and by using a rotor-stator device the particle size D90 could be reduced again by a factor of 7.

EXAMPLE 3 (SPLIT POLYOL DOSING)

The sample collected after the rotor-stator device had a particle size of D50=1,343 μm, D90=1,949.

The viscosity of the sample collected after rotor stator device was 7145 mPas determined at 25° C. in accordance with DIN EN ISO 3219 from 1994

Recipe & Parameters
Cavitron speed: 265 Hz
Cooling temp: 60° C.

A recipe comprised of the 41 wt % of SAN, 12 wt % stabilizer 1 and 47 wt % Lupranol® 2095 was used. SAN was fed into the extruder in zone 1, all the stabilizer was injected into extruder zone 3. Lupranol® 2095 dosing was split between extruder zones 4 and 7 with 30 wt % and 17 wt % respectively. The respective extruder processing parameters such as barrel temperature profile, screw rotation speed and throughput can be found in Table 2. The extruder set-up used is schematically represented in FIG. 2.

This example shows that the dosing of polyol can be split up in different parts of the extruder, in this case with a decrease in particle size distribution. As mentioned above, it is important that the polyol is dosed after the stabilizer. By using a split polyol dosing the particle size D90 could be reduced by 9%, compared to example 2.

Some figures have been added to illustrate some aspects of the present invention.

FIG. 1 shows an exemplary set-up of devices for the inventive process. Optionally, a stripping column is used to remove residual volatile components, like styrene or acrylonitrile. In a preferred embodiment of the inventive process, at least one stripping column is used. Thus, the amount of residual styrene in the product may be reduced to levels below 20 ppm and the amount of acrylonitrile below 5 ppm. Optionally at least one filter can be installed.

FIG. 2 shows a preferred embodiment of the inventive process, where in the first place, SAN is added to the extruder (E) into the first process zone, and then, later on, stabilizer (S) and polyol (P) are added successively into separate process zones of the extruder (E).

TABLE 2

Process parameters used in extrusion step for examples given above.
(GK 3496-024-01: example 1; GK 3496-024-02: example 2; GK 3496-030-01: example 3)

| Experiment number | Barrel set temperature | | | | | | | | | | | RPM [min⁻¹] | Through-put Polymer Zone 1 [kg/h] | Through-put Stabilizer Zone 3 [kg/h] | Through-put Polyol Zone 4 [kg/h] | Through-put Polyol Zone 7 [kg/h] |
| --- | --- | --- | --- | --- | --- | --- | --- | --- | --- | --- | --- | --- | --- | --- | --- | --- |
| | Zone 1 [° C.] | Zone 2 [° C.] | Zone 3 [° C.] | Zone 4 [° C.] | Zone 5 [° C.] | Zone 6 [° C.] | Zone 7 [° C.] | Zone 8 [° C.] | Zone 9 [° C.] | Zone 10 [° C.] | Zone 11 Head [° C.] | | | | | |
| GK3496-030-01 | 30 | 230 | 210 | 210 | 190 | 190 | 190 | 190 | 190 | 190 | 190 | 500 | 2.4 | 0.9 | 2.7 | |
| GK3496-024-02 | 30 | 230 | 210 | 210 | 190 | 190 | 190 | 190 | 190 | 190 | 190 | 500 | 2.4 | 0.9 | | 2.7 |
| GK3496-024-01 | 30 | 230 | 210 | 210 | 190 | 190 | 190 | 190 | 190 | 190 | 190 | 500 | 4,920 | 1.44 | 3.60 | 2,040 |

The polymer polyol obtainable by the inventive process may be used for the production of polyurethanes, in particular for flexible polyurethane foams.

Polymer polyols made according to the present invention may be reacted with polyisocyanate. The polyisocyanates may be selected from the group comprising aliphatic, cycloaliphatic, arylaliphatic and aromatic isocyanates. Among them, aromatic polyisocyanates are preferred. Examples of suitable aromatic isocyanates include 2,4'-, 2,6-isomers of toluene diisocyanate (TDI), 4,4'-, 2,4' and 2,2'-isomers of diphenylmethane diisocyante (MDI), or mixtures thereof. Optionally, a blowing agent may also be used.

The polymer polyols obtainable by the inventive process may be used in a variety of applications. Inter alia, the may be used for the production of polyurethane (PU) foams, like microcellular foams, flexible foams, formed flexible foams, viscoelastic foams, rigid foams for construction or insulation applications, or PU elastomers, thermoplastic polyurethanes (TPU), PU coatings, PU sealants, PU adhesives, surfactants, lubricants, dispersants, concrete liquefiers, as seed or starting material for the production of polymer polyols, as seed or starting material for aqueous polymer dispersions, as seed or starting material In one embodiment, the polymer polyols obtainable by the inventive process are used for the production of flexible polyurethane foams. Preferred applications of the polyurethane foams include footwear applications and applications in the car sector and furniture, for example car seats.

The invention claimed is:
1. A continuous process for making a polymer polyol, the polymer polyol comprising:
   particles of a thermoplastic styrene-acrylonitrile-copolymer (TP);
   at least one polyol (P); and
   a stabilizer (S);
   wherein the stabilizer (S) comprises:
   from 10 to 70% by weight, based on the sum of all components, of at least one polyol P2, and at least one polyol CSP which is a reaction product of at least one macromere M, styrene and acrylonitrile in P2, optionally with an initiator and/or a chain transfer agent, wherein the macromere comprises one or more polymerizable double bonds and one or more hydroxyl-terminated polyether tails, a content of the macromere M in the stabilizer (S) is between 30-70 wt %, based on the sum of all components of the stabilizer, wherein the polyol CSP comprises two or more —OH groups, the process comprising:

continuously feeding the TP, the P and the S to an extruder (E) having a plurality of process zones, preparing an initial dispersion of the TP, the P and the S in the extruder (E);

continuously passing the initial dispersion obtained in the extruder into at least one rotor-stator device (RS) decoupled from the extruder comprising at least one rotor-stator combination; and cooling the rotor-stator treated dispersion below the glass transition temperature ($T_g$) of the thermoplastic styrene-acrylonitrile-copolymer (TP) after passing all of the rotor-stators (RS) to obtain the polymer polyol, wherein in the preparation of the initial dispersion, TP is continuously fed into a first process zone Z1 of the extruder E, S is continuously fed into a second process zone Z2 or a later process zone, and P is continuously fed into a process zone following the process zone of addition of S, wherein the terms "first" and "second" refer to a direction of flow of the reaction mixture through the extruder E.

2. The process according to claim 1, wherein there is at least one process zone of the extruder E wherein no components are added between the zone of addition of the stabilizer S and the zone of addition of the polyol P.

3. The process according to claim 1, wherein P is fed into at least two different process zones after the zone of addition of the stabilizer S of the extruder E.

4. The process according to claim 1, wherein the extruder (E) is operated at a barrel temperature in the range of between 160° to 250° C. in at least one of the plurality of process zones.

5. The process according to claim 1, wherein a rotation speed of the extruder (E) is from 400 to 1200 rpm.

6. The process according to claim 1, further comprising removing volatile material in a stripping column or stripping-vessel after the rotor-stator device.

7. The process according to claim 1, wherein at least one of the at least one-level rotor-stator devices (RS) are operated at a set temperature of 160° to 250° C.

8. The process according to claim 1, wherein at least one of the rotor-stator devices (RS) has a circumferential speed in the range of 10 to 60 $s^{-1}$.

9. The process according to claim 1, wherein at least one of the rotor-stator devices comprises at least two rotor-stator combinations.

10. The process according to claim 9, wherein each single rotor-stator combination of the at least two rotor-stator combinations have differing teeth.

11. The process according to claim 1, wherein the polyol (P) is added to the extruder (E) at a temperature of above 100° C.

12. The process according to claim 1, wherein the stabilizer (S) is added to the extruder (E) at a temperature of above 100° C.

13. The process according to claim 1, wherein the polyol (P) is liquid at room temperature.

14. The process according to claim 1, wherein the polyol (P) is selected from the group of polyols consisting of polyols employed for slabstock foam applications and polyols employed for molded foam applications.

15. The process according to claim 1, wherein an average OH value of the polyol (P) is between 20 and 300 mg KOH/g.

16. The process according to claim 1, wherein an average functionality of the polyol (P) is from 2 to 6.

17. The process according to claim 1, wherein an average particle size of the product according to D50 is below 25 µm, as determined by static laser diffraction.

18. The process according to claim 1, wherein the polyol P2 contained in the stabilizer S is a polyether polyol (PEOL).

19. The process according to claim 1, wherein an average molecular weight of the macromere M is from 1000 to 50000 g/mol.

20. The process according to claim 1, wherein the macromere M is obtained by reaction of 1,1-dimethyl meta isopropenyl benzyl isocyanat (TMI) with a polyether polyol PM, selected from the group consisting of three- and six-functional polyether polyols, the reaction optionally conducted in the presence of a Lewis acid catalyst.

21. The process according to claim 1, wherein a ratio of styrene to acrylonitrile in the polyol CSP is greater than 1:1.

22. The process according to claim 1, comprising a chain transfer agent and an initiator in production of the stabilized S wherein the chain transfer agent is selected from the group consisting of dodecane thiol, isopropanol and 2-butanol, and the initiator is selected from the group consisting of azoisobutyro nitrite (AIBN) and Dimethyl 2,2'-azobis(2-methylpropionate).

23. The process according to claim 1, wherein a ratio of styrene to acrylonitrile in the styrene-acrylonitrile-copolymer (TP) is greater than 1:1.

24. The process according to claim 1, wherein the dispersion is cooled below the $T_g$ of the thermoplastic styrene-acrylonitrile-copolymer (TP) within a maximum time range of four hours after passing all of the rotor-stator devices (RS).

25. The process according to claim 1, wherein the dispersion is cooled to a temperature of equal to or less than 60° C., within a maximum time range of four hours after passing all of the rotor-stator devices (RS).

26. The process according to claim 1, wherein a particle size distribution of the polymer polyol is monomodal, bimodal or multimodal.

27. The process according to claim 9, wherein the first rotor-stator combination has coarse teeth, the next rotor-stator combination in the flow direction has medium fine teeth, and the third rotor-stator combination in the flow direction has fine teeth.

* * * * *

UNITED STATES PATENT AND TRADEMARK OFFICE
CERTIFICATE OF CORRECTION

PATENT NO. : 10,370,479 B2  
APPLICATION NO. : 15/306338  
DATED : August 6, 2019  
INVENTOR(S) : Christian Koenig et al.

Page 1 of 1

It is certified that error appears in the above-identified patent and that said Letters Patent is hereby corrected as shown below:

In the Claims

In Column 9, Line 26, Claim 1, delete "polyol," and insert -- polyol; --, therefor.

Signed and Sealed this  
Seventh Day of January, 2020

Andrei Iancu  
*Director of the United States Patent and Trademark Office*